(12) United States Patent
Davis et al.

(10) Patent No.: US 9,876,468 B2
(45) Date of Patent: Jan. 23, 2018

(54) METHOD, SYSTEM AND PROGRAM PRODUCT FOR PHOTOVOLTAIC CELL MONITORING VIA CURRENT-VOLTAGE MEASUREMENTS

(71) Applicant: UNIVERSITY OF CENTRAL FLORIDA RESEARCH FOUNDATION, INC., Orlando, FL (US)

(72) Inventors: Kristopher O. Davis, Orlando, FL (US); David K. Click, Orlando, FL (US); Robert M. Reedy, Auburndale, FL (US); Winston V. Schoenfeld, Oviedo, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 249 days.

(21) Appl. No.: 14/442,487

(22) PCT Filed: Nov. 19, 2013

(86) PCT No.: PCT/US2013/070724
§ 371 (c)(1),
(2) Date: May 13, 2015

(87) PCT Pub. No.: WO2014/081695
PCT Pub. Date: May 30, 2014

(65) Prior Publication Data
US 2016/0276976 A1    Sep. 22, 2016

Related U.S. Application Data

(60) Provisional application No. 61/728,322, filed on Nov. 20, 2012.

(51) Int. Cl.
*H02S 50/10*    (2014.01)
*H02S 50/00*    (2014.01)

(52) U.S. Cl.
CPC .............. *H02S 50/10* (2014.12); *H02S 50/00* (2013.01)

(58) Field of Classification Search
None
See application file for complete search history.

(56) References Cited

U.S. PATENT DOCUMENTS 8,744,791 B1 *   6/2014   Kraft ....................... H02S 50/00
                                                          702/65
9,515,602 B2 *   12/2016  Thompson ............. G01R 31/26
(Continued)

FOREIGN PATENT DOCUMENTS

JP          2010245410 A        10/2010
KR       1020030076800 A         9/2003
(Continued)

OTHER PUBLICATIONS

International Search Report Form PCT/ISA/220, International Application No. PCT/US2013/070724, pp. 1-10, International filed Nov. 19, 2013.

*Primary Examiner* — Jermele M Hollington
(74) *Attorney, Agent, or Firm* — Bond, Schoeneck & King, PLLC; William Greener; Alek Szecsy

(57) ABSTRACT

A method, a system and a program product for use when monitoring degradation of a photovoltaic cell each use a plurality of current-voltage curves for the photovoltaic cell obtained at a plurality of predetermined times, where the plurality of current-voltage curves is obtained when the photovoltaic cell (or related module, string or array) is in operational service. The use of such a plurality of current-voltage curves provides for extraction of a plurality of (Continued)

degradation characteristics or parameters for the photovoltaic cell.

17 Claims, 4 Drawing Sheets

(56) References Cited

U.S. PATENT DOCUMENTS

| | | | |
|---|---|---|---|
| 2002/0030153 A1* | 3/2002 | Matsuyama | H02S 50/10 |
| | | | 250/214.1 |
| 2012/0049855 A1* | 3/2012 | Crites | H01L 31/02021 |
| | | | 324/537 |
| 2012/0242320 A1 | 9/2012 | Fischer et al. | |
| 2012/0248335 A1* | 10/2012 | Kim | H02S 50/10 |
| | | | 250/459.1 |
| 2014/0132302 A1* | 5/2014 | Nagel | G01R 31/129 |
| | | | 324/761.01 |
| 2016/0011246 A1* | 1/2016 | Fischer | G01R 15/202 |
| | | | 324/126 |

FOREIGN PATENT DOCUMENTS

| KR | 1020100072457 A | 7/2010 |
|---|---|---|
| KR | 101137687 B1 | 4/2012 |

\* cited by examiner

METHOD, SYSTEM AND PROGRAM PRODUCT FOR PHOTOVOLTAIC CELL MONITORING VIA CURRENT-VOLTAGE MEASUREMENTS

CROSS-REFERENCE TO RELATED APPLICATION

This application is related to, and derives priority from, U.S. Provisional Patent Application Ser. No. 61/728,322, filed 20 Nov. 2012 and titled Method and Apparatus for Photovoltaic Cell Monitoring via Current-Voltage Measurements, the contents of which is incorporated herein fully by reference.

STATEMENT OF GOVERNMENT INTEREST

Not applicable.

BACKGROUND

Field of the Invention

Embodiments relate generally to methods and systems for monitoring photovoltaic cells. More particularly, embodiments relate to methods and systems for enhanced monitoring of photovoltaic cells.

Description of the Related Art

Photovoltaic cells are becoming an increasingly important source of sustainable electrical power that may be obtained absent dependence upon fossil fuel sources that coincidentally produce large quantities of detrimental greenhouse gasses. Notwithstanding the desirability of photovoltaic cells as sustainable electrical power sources, photovoltaic cell performance may deteriorate over time, and for that reason routine monitoring of photovoltaic cell performance is desirable.

Thus, given the importance of photovoltaic cells as a source of sustainable electrical power desirable also are enhanced methods and systems for monitoring photovoltaic cell performance.

SUMMARY

Embodiments provide a method, a system and a program product for monitoring a photovoltaic cell, such as but not limited to a solar photovoltaic cell.

The embodiments provide the method, the system and the program product for identifying potential failures and degradation mechanisms, in both a diagnostic and prognostic fashion, for photovoltaic (PV) cells, modules, source circuits (i.e., strings), and arrays. The embodied method is carried out by the related embodied system and related embodied program product, and thus the embodied method, the embodied system and the embodied program product provide for recording current-voltage (I-V) curves at multiple times (at least twice) through the course of a predetermined time period, such as, but not limited to a single day, under circumstances where a PV cell is installed and in operational service, and thus may be providing useful consumable electrical power.

For example, at least one of the I-V curves would be recorded during the day and at least one other I-V curve at night. Alternatively, the I-V curves could be recorded during sequential nights, or sequential days. In another alternative embodiment, the I-V curves could be recorded once per week over the course of at least two weeks, and generally even longer than two weeks, etc. The I-V curves are recorded while the photovoltaic cell, module, string, array, etc., is still in operational service to provide useful power to, for example, a battery, a portable electronic device, a house, or an electrical grid. In other words, the photovoltaic cell, module, string or array need not be disconnected (i.e., in particular physically disconnected) from its network to perform the diagnostic; rather, the diagnostic is performed while the photovoltaic cell, module, string or array is still connected to provide power. It should be noted, that the photovoltaic cell need not be providing useful power at the instant of measuring (i.e., such as might occur during a dark measurement), but that it be interconnected within an installation such that it could provide useful consumable power.

Thus, within the context of the embodiments as disclosed and the invention as claimed, "operational service" with respect to a PV cell, module, string, array or related component is intended to mean that the PV cell, module, string, array or related component is positioned (and in particular physically positioned) within a system such that the PV cell, module, string, array or related component is capable of providing consumable power, as described directly above.

In addition, within the context of the embodiments as disclosed and the invention as claimed, "a photovoltaic cell" or "at least one photovoltaic cell" is intended to mean at least one PV cell, module, string, array or related component, unless clearly indicated otherwise.

The I-V curves obtained in accordance with the embodiments (or alternatively derivative time based electrical information obtained from the I-V curves) can be stored over time, either on a remote server or locally, to identify trends in PV cell/module/string/array performance that might be indicative of a potential failure or accelerated performance degradation, e.g., increased series resistance, decreased shunt resistance, or a relevant change in some other electrical parameter. The I-V curves can be recorded using different variations of power electronics, including micro-inverters, micro-converters, string-level converters, string-level inverters and even array-level inverters, although the highest value comes from higher levels of segmentation (i.e., module-level is preferred as it facilitates the ability to pinpoint the source of failures/degradation).

A primary limitation commonly encountered not in accordance with the embodiments is that only a maximum power point of a module or array is monitored over time. Some level of failure/degradation identification is possible with this method, but it is extremely limited when one considers the wealth of information available from the combination of light and dark I-V curves. By recording and comparing the full I-V characteristic curves under illuminated conditions (forward and/or reverse bias) and dark conditions (forward and/or reverse bias) for the module or array, more detailed information can be extracted based on the trend of the critical electrical characteristics of the devices (e.g. short circuit current, open circuit voltage, fill-factor, series resistance and shunt resistance). The embodiments may be used by PV system operators to identify failures and potential failures of PV modules. The embodiments would most likely be integrated into a converter housed within the power conditioning unit attached to a module or array of photovoltaic cells.

This diagnostic/prognostic method can be used by string inverter, string converter, micro-converter and micro-inverter manufacturers to identify PV modules that could, or already have, failed or are severely degraded.

For reference, FIG. 1 shows a representative I-V diagram for a PV cell in accordance with the embodiments, illustrating in particular an illuminated I-V upper curve and an unilluminated I-V lower curve. Also illustrated in FIG. 1 is a maximum power point ($P_{max}$) at the confluence of the maximum current ($I_{max}$) and the maximum voltage ($V_{max}$).

An exemplary non-limiting method for diagnosing degradation in the performance of a photovoltaic cell, module, string or array in accordance with the embodiments, includes measuring a plurality of I-V curves of a photovoltaic cell, module, string or array at a predetermined plurality of times, while that same photovoltaic cell, module, string or array is in operational service, to provide a plurality of measured I-V curves. According to an aspect, the method also includes determining a trend indicative of a degradation characteristic of the photovoltaic cell, module, string or array over time, based upon the plurality of measured I-V curves.

An exemplary non-limiting system for diagnosing degradation in the performance of a photovoltaic cell, module, string or array in accordance with the embodiments, includes a measuring module for measuring at least one I-V curve of a photovoltaic cell, module, string or array at a predetermined plurality of times, while that same photovoltaic cell, module, string or array is in operational service, to provide a plurality of measured I-V curves. According to another aspect, the system also includes a comparator module for determining a trend indicative of a degradation characteristic of the photovoltaic cell, module, or array over time, based upon the plurality of measured I-V curves.

An exemplary non-limiting program product for diagnosing degradation in the performance of a photovoltaic cell, module, string or array in accordance with the embodiments, includes a tangible computer readable medium encoded with instructions to measure a plurality of I-V curves of a photovoltaic cell, module, string or array at a predetermined plurality of times, while that same photovoltaic cell, module, string or array is in operational service, to provide a plurality of measured I-V curves. According to yet another aspect, the computer program product also includes instructions to determine a trend indicative of a degradation characteristic of the photovoltaic cell, module, string or array over time, based upon the plurality of measured I-V curves.

BRIEF DESCRIPTION OF THE DRAWINGS

The objects, features and advantages of the embodiments are understood within the context of the Detailed Description of the Non-Limiting Embodiments, as set forth below. The Detailed Description of the Non-Limiting Embodiments is understood within the context of the accompanying drawings, that form a material part of this disclosure, wherein.

DETAILED DESCRIPTION OF THE NON-LIMITING EMBODIMENTS

Figure 1:
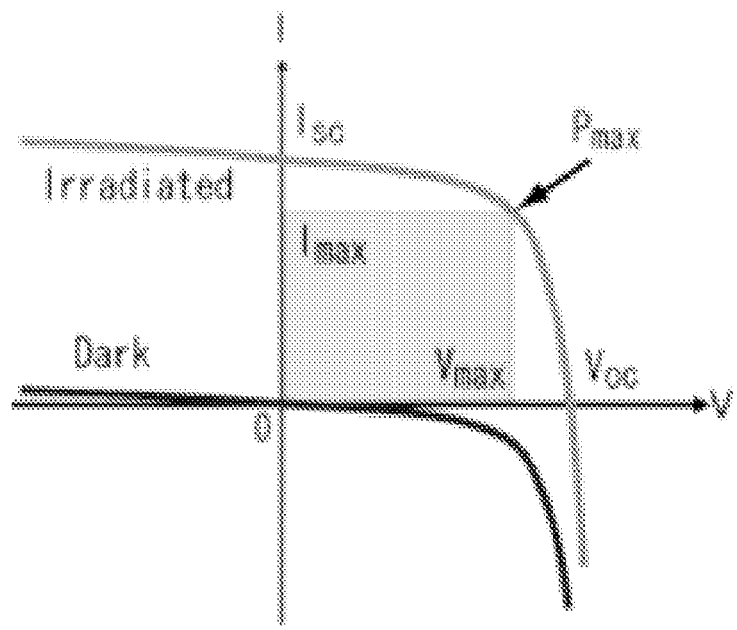
FIG. 1 shows a representative I-V diagram for a PV cell, illustrating in particular an illuminated I-V upper curve and an unilluminated I-V lower curve. Also illustrated in FIG. 1 is a maximum power point ($P_{max}$) at the confluence of the maximum current ($I_{max}$) and the maximum voltage ($V_{max}$).

The embodiments, which include a method for measuring degradation of at least one photovoltaic cell, such as a single cell, a module, a string or an array, as well as a system and a program product for measuring the degradation of at least one photovoltaic cell, are understood within the context of the description set forth below. Further, the description set forth below is understood within the context of the drawings described above. Since the drawings are intended for illustrative purposes, the drawings are not necessarily drawn to scale.

In general, the embodiments describe a method for measuring degradation of at least one photovoltaic cell, and a system and a program product for accomplishing the same. In broad terms, according to one embodiment, the method comprises: first measuring an I-V curve of at least one photovoltaic cell at a predetermined time, that photovoltaic cell still engaged in operational service at the time of measurement, measuring at least a second I-V curve at least a second predetermined time while the photovoltaic cell is still engaged in operational service, and comparing the measured I-V curves, or parameters of the measured I-V curves, to determine whether any particular quality, that could affect the I-V of the at least one photovoltaic cell, has changed in the time between each separate measurement.

The embodiments also describe a system and a program product for measuring the degradation of at least one photovoltaic cell. In general the system may comprise: a module for measuring a first I-V curve of at least one photovoltaic cell at a predetermined time, that photovoltaic cell still engaged in operational service at the time of measurement, measuring at least a second I-V curve at at least a second predetermined time while the photovoltaic cell is still engaged in operational service, and comparing the measured I-V curves, or parameters of the measured I-V curves, to determine whether any particular quality, that could affect the I-V curve of the at least one photovoltaic cell, has changed in the between each separate measurement. In general, the program product correlates with the method and the system.

According to the embodiments, the I-V curves are recorded while the photovoltaic cell, module, string, array, etc., is still in operational service to potentially provide useful consumable power to, for example, a battery, a portable electronic device, a house, or an electrical grid. In other words, the cell, module, or array need not be disconnected from its network to perform the diagnostic; rather, the diagnostic is performed while the cell, module, or array is still connected to provide useful consumable power. It should be noted, that the cell need not be providing useful power at the instant of measuring, but that it be interconnected such that it could provide useful power. As well, it is understood by a person skilled in the art that upon I-V curve measurement of a PV cell that is otherwise capable of producing useful consumable power, there may of necessity be a disconnect from a power production circuit in order to effect proper I-V curve measurement. Any such I-V curve measurement test based disconnect is not intended as compromising the status that the PV cell is otherwise capable of producing useful consumable power within the context of operational service.

It should be understood by one of ordinary skill in the art that the modules as described in the system above could be implemented in any combination of hardware, firmware, or software. For example, the modules could be implemented as an application specific integrated circuit, as a field-programmable gate array, as custom power electronics, etc. These embodiments could be implemented as a standalone device or alternatively integrated into an existing device such as in the converter housed in a power conditioning unit interconnected to at least one photovoltaic cell (such as a cell, module, or array). Alternatively, the modules could be implemented as a software algorithm stored on non-transitory computer medium, such as disc, hard drive, flash storage etc. The software could executed by a processor or other chip dedicated to reading a series of executable steps, and could be uploaded to the processor or other chip by disc, remote software patch, flash storage, etc.

According to the embodiments of the invention described above, the predetermined times of measurement could be at any times. For example, the first time of measurement could be during the day, and at least a second measurement could be at night. Alternatively, the both times could be during the night or during the day. Measurements could take place over a series of days, weeks, months, or years. In yet another alternative embodiment, measurements could occur at multiple times during the same day or 24 hour period, or could occur once every twelve months. The particular sequence of measurements would likely be determined by the parameter being measured. For example, a particular parameter may be best measured at night. To measure such a parameter, the predetermined times could be once per night. Or if the parameter is best measured at night and only changes very slowly, the predetermined times could be set be at one night every month, or every six months. For another parameter, the predetermined times could be once per day during daylight hours, etc.

According to one embodiment, the measurements of the I-V curves (or alternatively derivative electrical information obtained from the measurements of the I-V curves) could be stored on a remote server. These curves could be uploaded to the remote server after a predetermined period or directly after each measurement. The server may the one comparing the curves, or the curves may be compared by a separate computer that has access to the remotely stored I-V curves.

Figure 2:
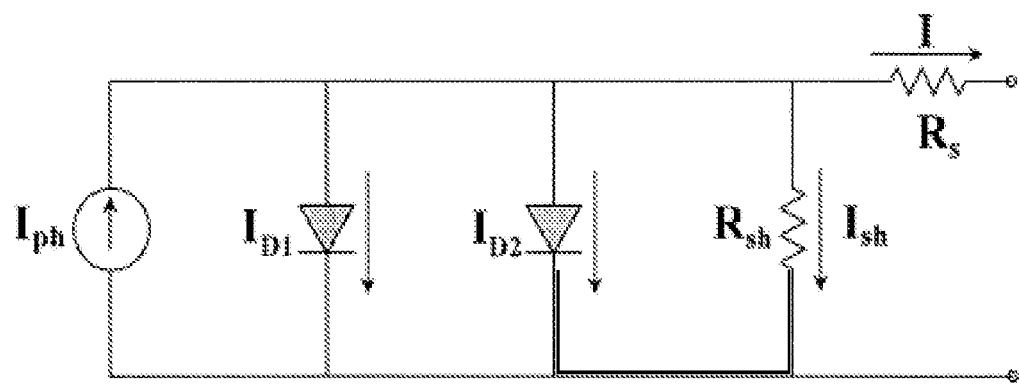
FIG. 2 shows a two-diode equivalent circuit model for a PV cell.

The parameters to be measured by the various embodiments of the invention are best understood by discussing the parameters of a circuit equivalent to a photovoltaic cell, module, or array such as is illustrated in FIG. 2. It should be understood that the parameters of the equivalent circuit are representative of actual parameters of a photovoltaic cell and are used for purposes of ease of explanation.

To translate the equivalent circuit of a cell to a module, series and series-parallel connections are used, series connections being the most common for commercially available modules. The same method can then be used to translate a module's equivalent circuit to that of an array. The transcendental equations governing the I-V characteristics of a cell are given by the following equations:

$$I = I_{01}\left(e^{\frac{qV_j}{n_1 kT}} - 1\right) - I_{02}\left(e^{\frac{qV_j}{n_2 kT}} - 1\right) - \frac{V_j}{R_{SH}}$$

$$V_j = V - IR_S$$

where $I_{01}$ and $I_{02}$ are the saturation currents of the diodes, $n_1$ and $n_2$ are the ideality factors of the diodes (these are related to the carrier recombination behavior in the device), T is the device temperature and k is the Boltzmann constant.

What follows now is a detailed description of the each of the parameters of the equivalent circuit and how they may be measured by the I-V curve of the photovoltaic cell, module, string or array.

Figure 3:
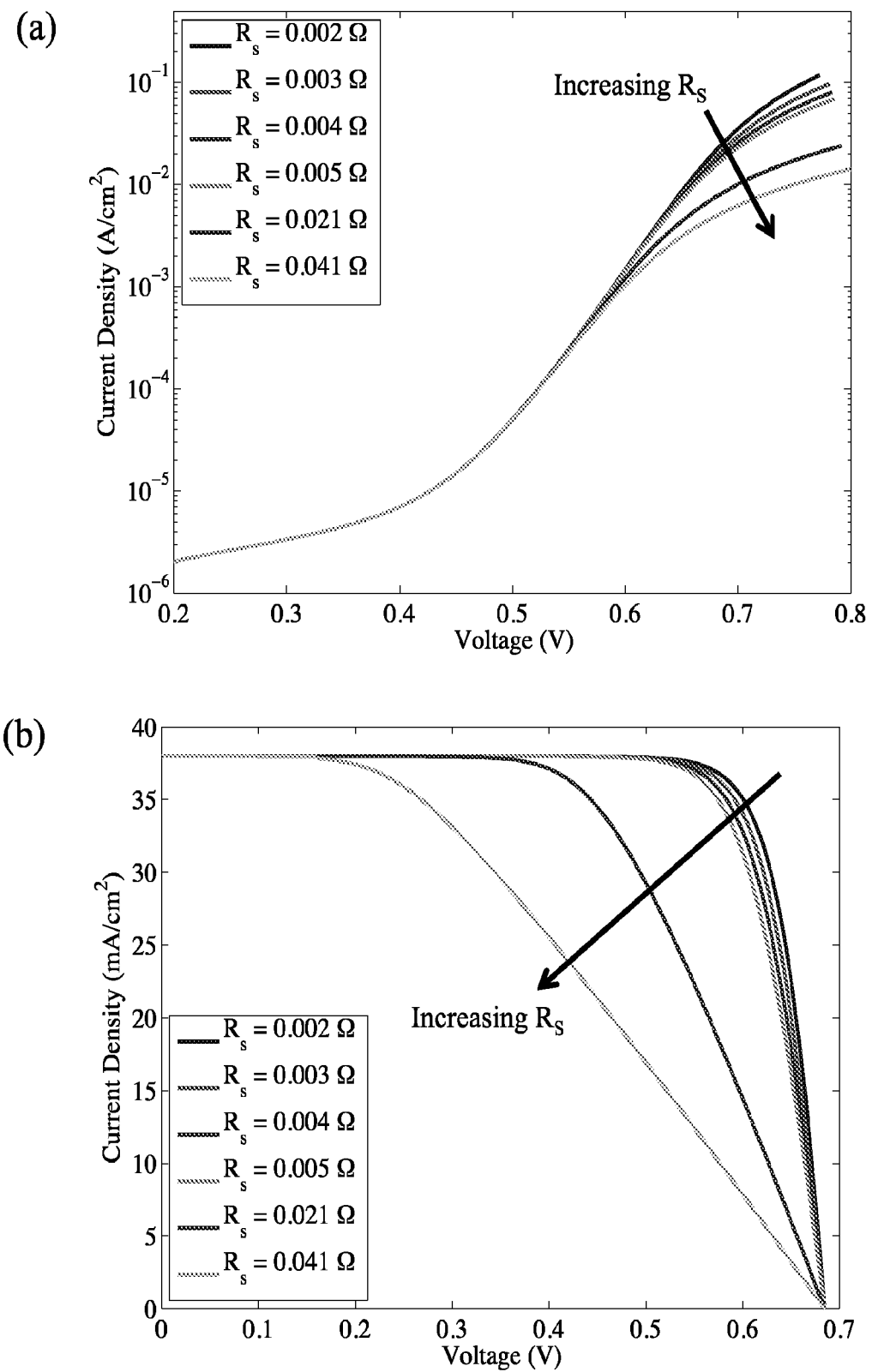
FIG. 3 shows influence of $R_S$ on: (a) the light I-V curve; and (b) dark I-V curve of a c-Si solar PV cell.

According to one embodiment, the first exemplary parameter that may be measured is the series resistance, $R_S$. This parameter is best measured using dark I-V curves, due to a higher measurement sensitivity compared to illuminated I-V. It has been shown that changes in module $R_S$ as small as 10% can be detected using dark I-V measurements, whereas for illuminated I-V curves, doubling $R_S$ only results in a 5% drop in the maximum power point ($P_{max}$). Changes in $R_S$ can provide important information about the overall state of the actual interconnect system, which includes solder bonds, solder tabs and metallization. These have been shown to be a commonly observed degradation mechanism in crystalline silicon (c-Si) PV modules. FIG. 3 illustrates the effect of $R_S$ on the dark and illuminated I-V characteristics of a c-Si solar cell, which was modeled using the two-diode equivalent circuit model. The embodiment of the invention compares at least two of the I-V curves to determine whether there is any similar flattening of the curve that signifies an increase in the series resistance. Ultimately, an increase in $R_S$ results in a loss in FF for a solar cell, module, string or array.

Figure 4:
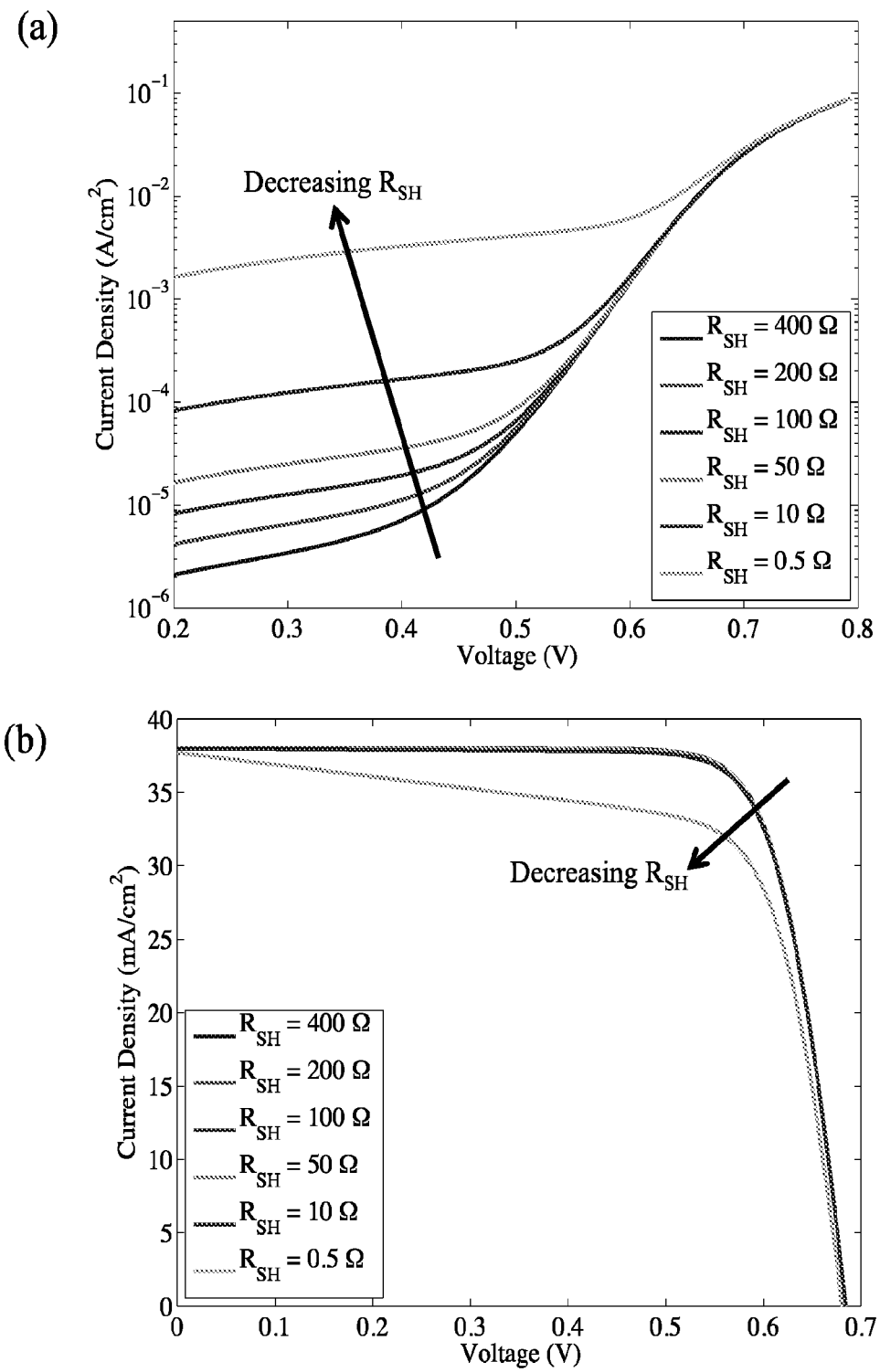
FIG. 4 shows influence of $R_{SH}$ on: (a) the light I-V curve; and (b) dark I-V curve of a c-Si solar PV cell.

Another exemplary parameter that may be measured is the shunt resistance, $R_{SH}$. Shunting refers to localized, high conductivity current paths though a cell or at the edges of a cell. Some causes of shunting can occur via material-induced defects (e.g., SiC inclusions) and poor edge isolation during solar cell manufacturing, as well as tunneling between n and $p^+$ regions cells in some device architectures. $R_{SH}$ in the two-diode equivalent circuit model provides a way to quantify this mechanism in terms of electrical performance. Increased shunting within a cell results in a decrease in $R_{SH}$. Ideally, $R_{SH}=\infty$ and $R_S=0$. In reality, $R_{SH}$ is finite, and reductions in $R_{SH}$ result in reduced cell (and therefore module) performance as well as potential failures over time. FIG. 4 illustrates the influence of $R_{SH}$ on the dark and illuminated I-V characteristics of a c-Si solar cell. While $R_{SH}$ clearly does not have as much of an effect on the cell $P_{max}$, it is still very critical, because the localized shunting can be a large reliability and safety liability if it goes undetected. Such a reliability and safety liability may be especially high in the case of partially shaded modules, which result in cells operating in reverse bias mode. This particular embodiment compares the measurement of at least two I-V curves to determine whether there is any similar change in the I-V curve, as seen in FIG. 4.

Another exemplary parameter that may be measured is the short-circuit current, $I_{SC}$. Current generation is approximately linear to the amount of solar radiation incident on a cell or module. Current is therefore heavily influenced by the optical properties of the module packaging materials and optical coatings on the frontside of the constituent cells. Module-level reliability concerns like encapsulation discoloration can therefore be detected by degradation in $I_{SC}$. Additionally, cell-level reliability issues involving optical coatings have also been observed in accelerated aging tests, including decomposition of $SiN_x$ layers due to moisture ingress and subsequent electrolytic corrosion. As shown in FIG. 1, $I_{SC}$ is simply extracted from the intersection of the illuminated I-V curve with the y-axis (i.e. point where V=0), and $V_{OC}$ is extracted the intersection of the illuminated I-V curve with the x-axis (i.e. point where I=0).

Parameters, like fill factor (FF) can also be monitored using illuminated I-V curves, which could also be of value. $I_{01}$, $I_{02}$ and $n_2$ can also be monitored using dark I-V curves. The fill factor (FF) can be calculated by the dividing the maximum power point ($P_{max}$) by the product ($I_{SC} \cdot V_{OC}$):

$$FF = \frac{P_{MP}}{I_{SC} V_{OC}}$$

Furthermore, the diode saturation current data has been shown as a way to detect permeability issues with anti-reflection coatings (ARC). Diode ideality factors are known to provide information about carrier recombination in devices, and it is feasible that monitoring $n_2$ could alert a system operator to potential device related issues.

The diode saturation currents and diode ideality factors of a cell or network of cells (e.g. module or array of modules) are more accurately determined from the dark I-V curve. In this case, the parameters are varied and numerical fitting of the equations of the two-diode (or other) equivalent circuit models to the experimentally collected dark I-V curve(s) are performed. These parameters can be extracted using this approach and then monitored over time in a manner similar to the other parameters previously described.

The actual shape of illuminated I-V curves also provides rich information about the overall performance of an array or module. Cell and module mismatch due to a number of different issues (e.g. soiling, partial shading, poor repeatability and quality control during manufacturing, cell cracking and ARC degradation) may contribute to performance degradation. This mismatch can be identified by the presence of multiple local maxima in the P-V curve of a cell, module or array. A system operator can therefore be alerted of this type of issue in an automated way, thereby reducing the preventative maintenance costs associated with the system.

Additionally, incorporation of the light I-V curve data into a power conditioning device could also allow for a performance check of the device's maximum power point tracking (MPPT) unit. For example, at times of lower than expected performance, an I-V curve could be run to ensure the MPPT unit is running at the actual maximum power point ($P_{max}$) and not just a local maximum. See FIG. 14 from Zimmermann et al., IEEE Journal of Photovoltaics 2, 47, (2012).

Figure 5:
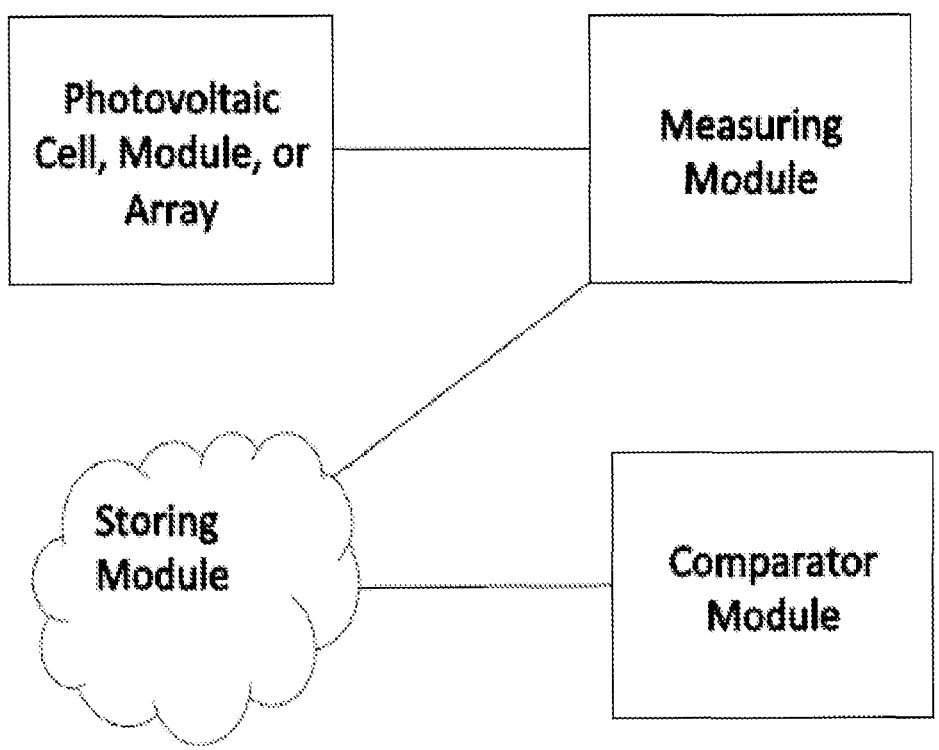
FIG. 5 shows a schematic block diagram of a system in accordance with the embodiments.

Finally, FIG. 5 shows a representative schematic block diagram of a system in accordance with the embodiments. The system shows a PV cell (or module, string or array) which is attached in a network fashion with a measuring module and a comparator module. As is illustrated within the representative schematic block diagram of FIG. 5, data storage is accomplished in a remote server (i.e., cloud) environment within the context of a storing module. The particular connections and interconnections of the various modules that are illustrated in FIG. 5 with respect to a PV cell, module, string or array are intended as representative and not limiting. Thus, alternative and additional configurations and components are also possible. Such additional components may include, but are not necessarily limited to, user interface components that may be attached to any one, or more, of the illustrated modules Within FIG. 5 with respect to the comparator module in particular, the comparator module may employ: (1) a predicted I-V curve calculated upon previous I-V curves (for the same PV cell) and available meteorological data (i.e., irradiance, module temperature and ambient temperature) or alternatively; (2) an I-V curve of another actual physical module (i.e., one of the other modules in the system). Alternatively, each measured module could be compared against all other measured modules if the I-V curve measurements were performed at the same time and under the same conditions. Alternative characteristics of a comparator module within the context of I-V curve measurement are not excluded within the context of the embodiments.

All references, including publications, patent applications, and patents cited herein are hereby incorporated by reference in their entireties to the extent allowed, and as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A method for measuring degradation of a photovoltaic module comprising a plurality of photovoltaic cells, comprising:
   measuring at least one current-voltage curve of a photovoltaic module at a plurality of predetermined times to provide a plurality of current-voltage curves, said plurality of predetermined times comprises at least a first time when said photovoltaic module is unilluminated and at least a second time when said photovoltaic module is unilluminated, wherein said photovoltaic module is in operational service at the time of said measuring; and
   determining a trend indicative of a degradation characteristic of said photovoltaic module over time based upon said current-voltage curve measured at the first time and said current-voltage measured at the second time.

2. The method of claim 1, wherein said plurality of predetermined times comprises at least one time when said photovoltaic module is under an illuminated condition.

3. The method of claim 1, further comprising the step of storing said measurements on a remote server.

4. The method of claim 1, wherein said step of determining comprises comparing a current-voltage curve from a first time of said plurality of predetermined times to at least one current-voltage curve from at least a second time of said plurality of predetermined times to determine whether there is a change in at least one parameter over time.

5. The method of claim 4, wherein said parameter is a value of a shunt resistance of said photovoltaic module.

6. The method of claim 4, wherein said parameter is a value of a series resistance of said photovoltaic module.

7. The method of claim 4, wherein said parameter is a value of a diode-saturation current of said photovoltaic module.

8. The method of claim 4, wherein said parameter is a value of a diode ideality factor of said photovoltaic module.

9. A system for measuring degradation of a photovoltaic module comprising a plurality of cells, comprising:
   a measuring module for measuring at least one current-voltage curve of a photovoltaic module at a plurality of predetermined times to provide a plurality of current-voltage curves, wherein said plurality of predetermined times comprises at least one time when said photovoltaic module is unilluminated and at least one other time when said photovoltaic module is unilluminated, wherein said photovoltaic module is in operational service at the time of said measuring;
   a comparator module for determining a trend indicative of a degradation characteristic of said photovoltaic module over time based upon the plurality of current-voltage curves.

10. The system of claim 9, wherein said plurality of predetermined times comprises at least one time when said at least one photovoltaic module is under an illuminated condition.

11. The system of claim 9, further comprising a storing module for storing said measurements on a remote server.

12. The system of claim 9, wherein said comparator is configured to compare a current-voltage curve from a first time of said plurality of predetermined times to at least one current-voltage curve from at least a second time of said plurality of predetermined times to determine whether there is a change in at least one parameter over time.

13. The system of claim 12, wherein said parameter is a value of a shunt resistance of said photovoltaic module.

14. The system of claim 12, wherein said parameter is a value of a series resistance of said photovoltaic module.

15. The system of claim 12, wherein said parameter is a value of a diode-saturation current of said photovoltaic module.

16. The system of claim 12, wherein said parameter is a value of a diode ideality of said photovoltaic module.

17. A computer program product for measuring degradation of a photovoltaic module comprising a plurality of cells, comprising:
   a tangible computer readable medium having encoded therein instructions to:
      measure at least one current-voltage curve of a photovoltaic module at a plurality of predetermined times to provide a plurality of current-voltage curves, the plurality of predetermined times comprising at least one time when said photovoltaic module is an unilluminated condition and at least one other time when said photovoltaic module is under an unilluminated condition, wherein said photovoltaic module is in operational service at the time of said measuring; and
      determine a trend indicative of a degradation characteristic of said photovoltaic module over time based upon said measurement of said plurality of current-voltage curves.

* * * * *